United States Patent [19]

Mills

[11] 4,321,004
[45] Mar. 23, 1982

[54] SELF-LOADING CARPET CART

[76] Inventor: Thomas V. Mills, 6704 SE. 83rd Ave., Portland, Oreg. 97266

[21] Appl. No.: 131,215

[22] Filed: Mar. 17, 1980

[51] Int. Cl.³ .......................... B60P 1/04; B60P 1/38; B60P 3/00
[52] U.S. Cl. ................................. 414/490; 414/491; 414/494; 414/501; 414/518; 414/559; 414/910; 414/911
[58] Field of Search ............... 414/490, 491, 492, 494, 414/501, 518, 528, 538, 559, 910, 911, 523, 398, 400

[56] References Cited

U.S. PATENT DOCUMENTS

| | | | |
|---|---|---|---|
| 26,421 | 12/1859 | Fancher | 414/538 X |
| 1,378,631 | 5/1921 | Stone | 414/538 X |
| 1,597,592 | 8/1926 | Galloway | 414/538 X |
| 1,602,112 | 10/1926 | Johnson | 414/538 |
| 1,704,841 | 3/1929 | Sacerdote | 414/523 |
| 1,708,854 | 4/1929 | Stahlhut | 414/538 X |
| 2,572,945 | 10/1951 | Quesnoit | 414/538 X |
| 2,656,050 | 10/1953 | Best et al. | 414/538 X |
| 2,659,504 | 11/1953 | Kranawetvogel et al. | 414/538 X |
| 3,750,811 | 8/1973 | Anderson et al. | 414/559 X |
| 3,971,484 | 7/1976 | Anderson et al. | 414/559 |

FOREIGN PATENT DOCUMENTS 8654 of 1908 United Kingdom ................ 414/494

Primary Examiner—James L. Rowland
Attorney, Agent, or Firm—Klarquist, Sparkman, Campbell, Leigh, Whinston & Dellett

[57] ABSTRACT

A self-loading and unloading carpet cart is a lightweight, two-wheeled, tiltable cart having an endless belt conveyor centered above and between the wheels. A dual-drum winch is mounted forwardly of the wheels. For loading a carpet roll on the conveyor, the cart is positioned at one end of the roll with the conveyor aligned lengthwise with the roll. A cable connected to each winch drum is extensible rearwardly along the sides of the conveyor to connect to opposite sides of a carpet roll yoke. The yoke is adapted to engage the remote end of the carpet roll so that the roll can be winched onto the conveyor. A reversible, variable-speed electric motor is drivably connected to the conveyor, wheels and winch via separate clutches. The conveyor, wheels and winch are synchronized so that they can be operated separately or together in various combinations to load, transport, or unload a carpet roll in a variety of situations.

12 Claims, 9 Drawing Figures

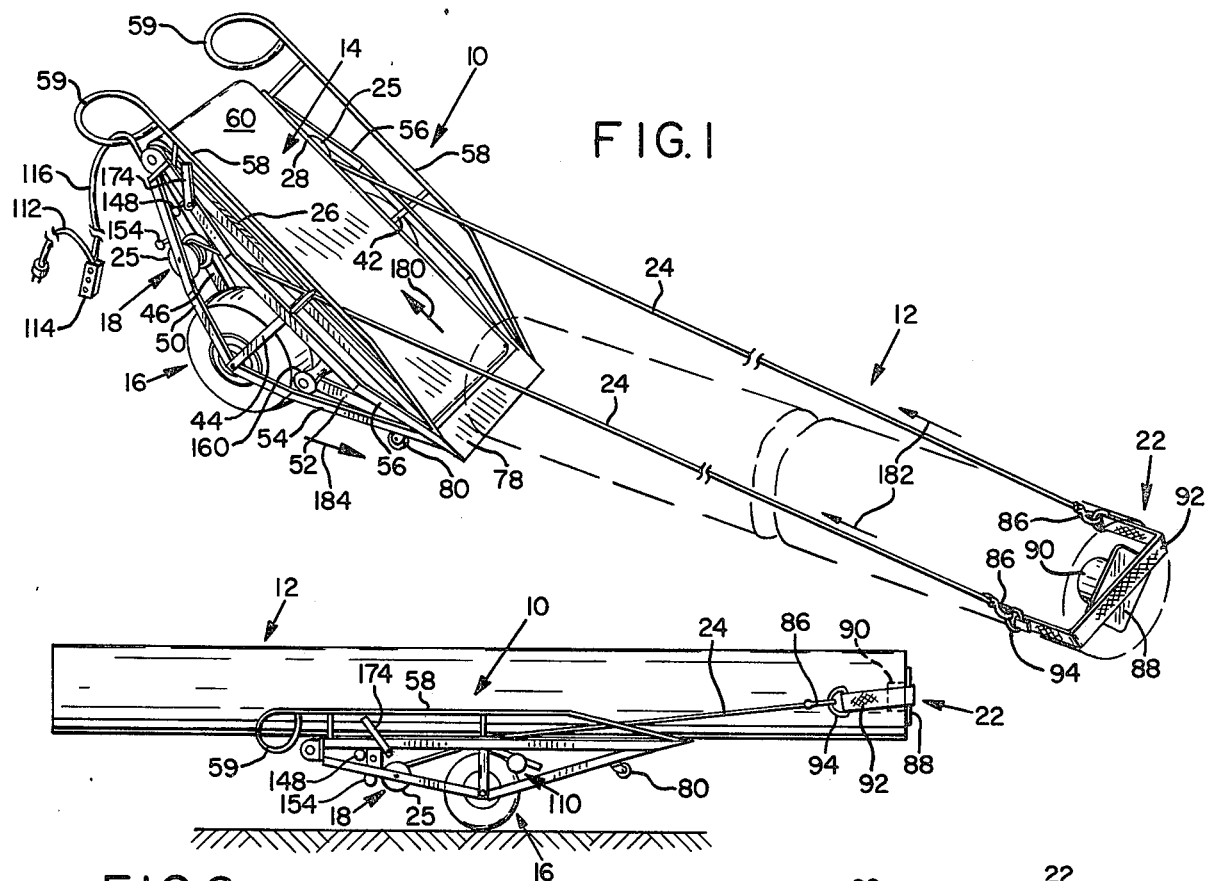
FIG.1
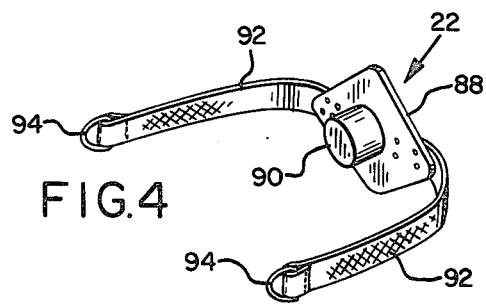
FIG.2
FIG.4
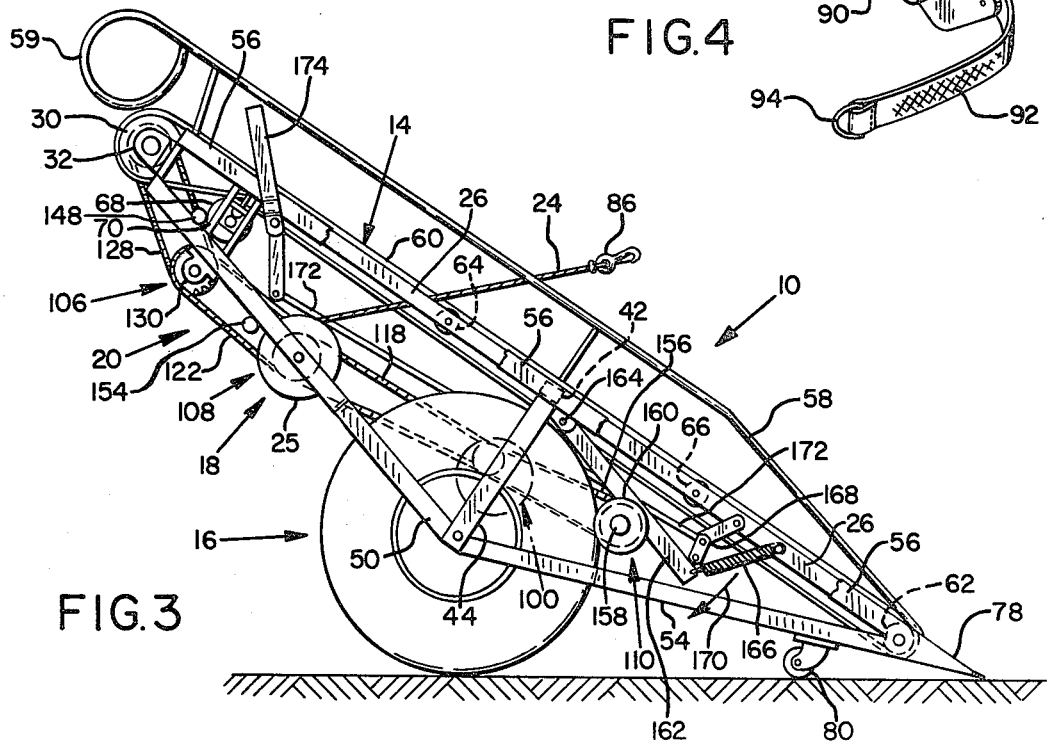
FIG.3

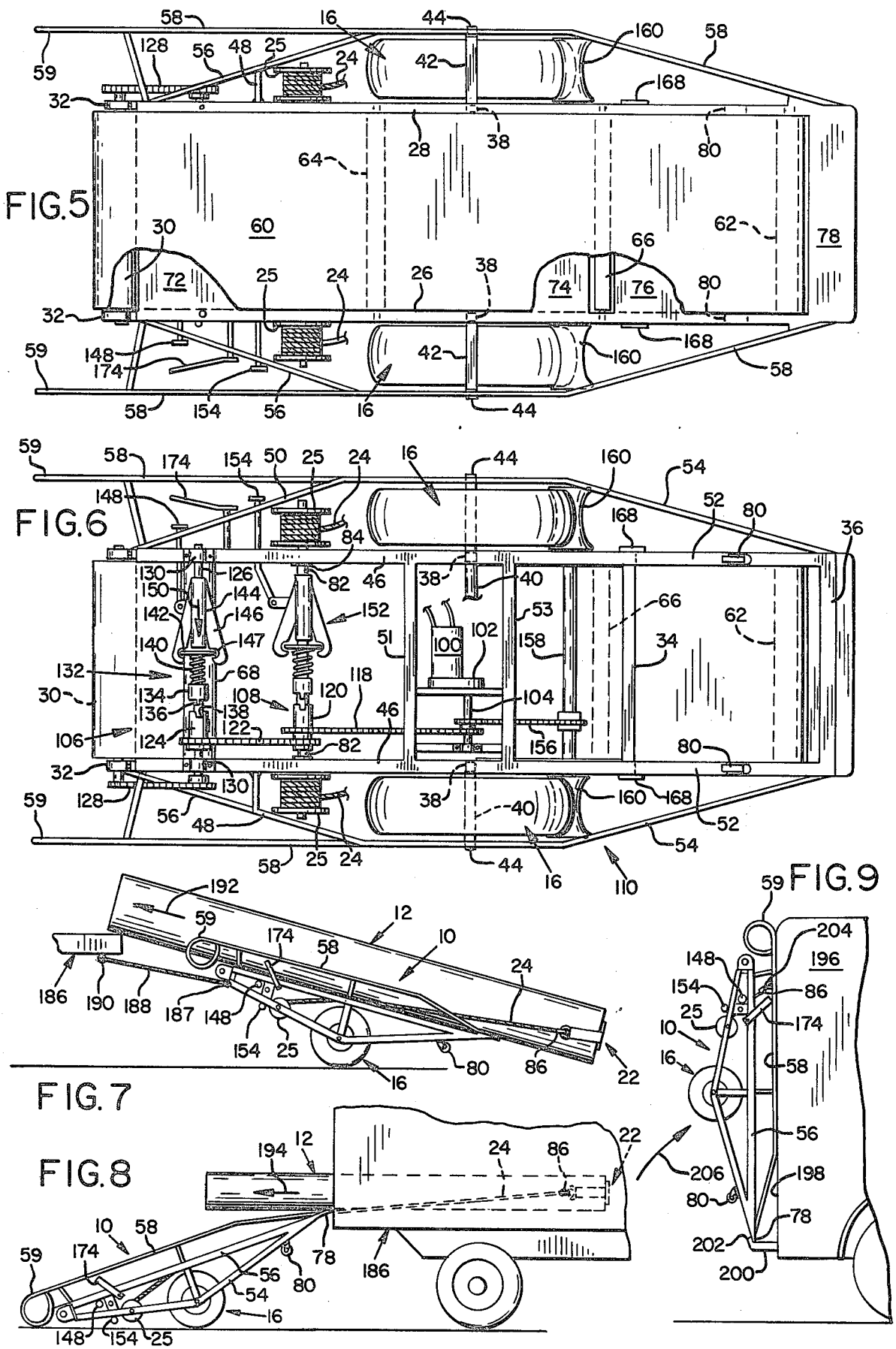

SELF-LOADING CARPET CART

BACKGROUND OF THE INVENTION

The invention relates generally to self-loading and unloading wheeled vehicles, and more particularly to vehicles adapted for self-loading and unloading of rolled materials such as carpet.

The handling of large rolls of carpet presents a difficult problem. Such rolls are bulky and very heavy, weighing 1000 to 1500 pounds each. Consequently, manual handling of carpet rolls is clearly undesirable. Carpet rolls must also be handled gently to avod damaging or soiling them.

In carpet warehouses, rolls of carpet are usually handled by means of a forklift. However, forklifts are often difficult to maneuver in tight spaces inside a carpet warehouse. Their use frequently results in damage either to the rolls of carpet being handled or to other nearby rolls. To exercise proper care in using a forklift in the warehouse can be very time consuming, resulting in an undesireable tradeoff between labor costs and damaged carpet. Moreover, forklifts are very expensive both to purchase and to operate.

As a result, several carpet handling devices have been proposed in U.S. Pat. Nos. 2,656,050 to Best et al. and 3,750,811 to Anderson et al. Best et al. propose a four-wheeled dolly having a roller-type cradle for the carpet roll which is particularly adapted for rolling and unrolling the carpet while positioned on the dolly. Such a device is unable to self-load a carpet positioned either at floor level, in the bed of a truck, or on a pile of carpet rolls. Hence, its utility is quite limited.

Anderson et al. propose a wheeled carpet roll unloading and transporting frame which is designed to straddle a roll of carpet lengthwise. A rod is inserted through the central opening in the roll of carpet and the ends of the rod are connected to cables extending downwardly from the frame. A winch is operable to wind and unwind the cables to raise and lower the carpet. One of the cables can also be used for unloading a roll of carpeting from a truck. However, this frame assembly is very difficult to maneuver inside a warehouse, particularly when carrying a carpet roll. It also does not appear to be usable to load a carpet roll into a truck.

A different set of problems arises when transporting carpet rolls to a remote building site and unloading them. There is usually no forklift on site. Nor can a forklift be easily transported to the many sites to which carpet may be delivered. The apparatus proposed by Anderson et al. has the same lack of portability as a forklift, while the apparatus proposed by Best et al. is unable to unload a carpet from a truck. Consequently, when delivering carpet to a remote building site, it is necessary to provide sufficient manpower to manually handle the carpet rolls. Since it would be very expensive to provide sufficient manpower on a delivery truck, carpet is usually delivered by a lone driver. The driver relies upon being able to get help in unloading the carpet when he arrives at the building site. If help is not available, the driver frequently must abort the delivery and return at another time, greatly increasing delivery costs.

As a solution to this problem, Anderson et al. propose, in U.S. Pat. No. 3,971,484, a truck-mounted carpet roll loading and unloading system which is built into the roof of a covered delivery truck. This system includes an electric winch and cable assembly for pulling a carpet into and out of the back of the truck. However, this system is limited to use in the immediate vicinity of the truck. If the carpet roll must be transported some distance between the truck and the place where it is to be deposited, this system is useless.

Although not designed for handling carpet rolls, other self-loading vehicles have been proposed.

U.S. Pat. No. 1,708,854 to Stahlhut, proposes a truck for handling rolled sheet steel. It includes a winch and cable system that operates to pull a roll of sheet steel lengthwise onto a conveyor platform. The device has conveyor rollers on the platform, but does not appear to include means for driving the rollers. Also lacking are means for driving the wheels of the device. Hence, this device does not appear to be usable for loading or unloading carpet rolls in a variety of situations. In addition, it does not appear to be usable for transporting carpet rolls, particularly across uneven or soft terrain. It also does not appear to be particularly portable.

U.S. Pat. No. 2,572,945 to Quesnoit, proposes a dolly having a platform tiltably mounted above a pair of wheels. The platform includes a separate, wheeled ramp for supporting an object to be loaded so that it can be rolled onto the platform. A winch positioned at one end of the platform has a chain which connects to an object to be loaded for pulling the object onto the platform from the opposite end. The platform itself lacks a conveyor which is drivable to assist the winch in pulling the roll of carpet onto the dolly or in unloading the carpet. Hence, this device does not appear to be useful for handling rolls of carpet.

Several specialized, four-wheeled, non-tiltable self-loading vehicles have been proposed. U.S. Pat. No. 26,421 to Francher proposes a stone loading wagon. U.S. Pat. No. 1,597,592 to Galloway proposes a truck especially adapted for carrying large plate glass panels and the like. U.S. Pat. No. 2,659,504 to Kranawetvogel et al., proposes a trailer adapted for loading and transporting, in piggy-back fashion, wheeled containers. However, none of these designs appear to be useful for handling rolls of carpet.

Accordingly, there remains a need for a self-loading and unloading apparatus suitable for handling large rolls of carpet both in a carpet warehouse and at remote sites.

SUMMARY OF THE INVENTION

It is therefore an object of the invention to provide a multi-purpose vehicle for handling rolled materials such as carpeting.

Another object is to provide a vehicle capable of self-loading rolled carpets from the floor, from a truck bed or unloading dock or from a stack of carpet rolls.

A further object is to provide a vehicle for easily transporting a roll of carpet on a variety of surfaces, including grass or other uneven, soft or inclined surfaces.

A further object of the invention is to provide a vehicle which is capable of self-unloading a carpet roll onto either a floor or an elevated surface.

Yet another object of the invention as aforementioned is to provide a carpet handling vehicle which is easily portable.

The invention is of a two-wheeled cart adapted for self-loading, unloading and transporting large rolls of carpet and the like. The cart includes a conveyor means supported on a tiltable frame for moving a carpet roll lengthwise along a conveyor path. The cart also includes means for moving the roll onto and off of the conveyor, such as winch means. The winch means includes a cable extensible along the conveyor path to a yoke or other means for engaging a remote end of a roll of carpet aligned lengthwise of the conveyor path. Operation of the winch means pulls the roll of carpet toward the cart, if the cart is held in a fixed position. Otherwise, the winch pulls the cart toward the carpet roll until they meet. When the nearer end of the carpet roll contacts the lower end of the conveyor, the conveyor lifts the end of the carpet onto the cart and assists the winch in loading the roll. When the roll is approximately centered over the wheels, the conveyor tilts to an approximately horizontal attitude. The cart then can be rolled on its wheels to transport the carpet to a designated location. To unload, the cart is positioned with one end near where the carpet roll is to be placed. The moving means and conveyor means are then operated to discharge the roll lengthwise from such end. Drivable wheel means can be used, either with or without the assistance of the winch means, to assist the conveyor means in loading or unloading the roll, as well as transporting it. The drive means can include a motor, which is preferably a reversible, variable-speed electric motor, and multiple clutches or other means for selectively engaging the motor to the winch means, the conveyor means, the wheels, or to any combination of such elements.

A truck or other vehicle used for hauling carpet rolls can be adapted for self-loading the cart for transporting to a remote location. This can be done by providing means on the lower portion of the truck's tailgate for pivotally supporting an end of the cart opposite the winch, and means on an upper portion of the truck for connecting the winch cable so that the winch means can be operated to rotate the cart about the supporting means between the ground level and a vertical position along the tailgate of the truck.

BRIEF DESCRIPTION OF DRAWINGS

FIG. 1 is a perspective view of a carpet cart according to the invention and a carpet roll as they appear when viewed from the cart's loading end.

FIG. 2 is a side elevational view of the cart of FIG. 1 showing the carpet roll in a loaded position.

FIG. 3 is a side elevational view of the cart of FIG. 1, with its loading end tilted down for loading a carpet roll from the floor, portions of the framework being cut away to show interior details.

FIG. 4 is a perspective view of a carpet yoke adapted for use with the dual winch of the cart of FIG. 1.

FIG. 5 is a top plan view of the cart of FIG. 1, portions of the conveyor belt being cut away to show interior details.

FIG. 6 is a bottom plan view of the cart of FIG. 1, a portion of the axle being cut away for clarity.

FIG. 7 is a side elevational view of the cart of FIG. 1 shown unloading a carpet onto a truck bed.

FIG. 8 is a side elevational view of the cart of FIG. 1 shown unloading a carpet onto the cart from a truck bed.

FIG. 9 is a side elevational view of the cart of FIG. 1 shown self-loaded onto the tailgate of a truck.

DETAILED DESCRIPTION OF A PREFERRED EMBODIMENT

FIG. 1 shows a tiltable self-loading carpet cart 10 according to the invention in position for self-loading a carpet roll 12 lengthwise from the floor. The cart includes an endless belt conveyor means 14 centered over a pair of wheels 16, a dual winch means 18 positioned forwardly of the wheels and drive means 20, (FIGS. 3 and 6) for driving the wheels, conveyor and winch. A carpet yoke 22 is received in the remote end of the carpet roll. A pair of winch cables or ropes 24 windably connected to winch drums 25 extend rearwardly along the lateral sides of the conveyor and the carpet roll to connect to the carpet yoke.

The carpet cart is organized about a supporting structural framework. This framework includes a rectangular frame comprising a pair of parallel main frame members 26, 28, extending lengthwise along the sides of the conveyor and rigidified by transverse bracing. The transverse bracing includes the shaft of front conveyor drive roller 30 extending between bearings 32 mounted at the front ends of the main frame members, intermediate braces 34 and a rear brace 36, best seen in FIG. 6.

A pair of inner wheel struts 38 (FIG. 6) extend downwardly at a right angle from the main frame members 26, 28 to connect to wheel axle 40 at approximately the lengthwise center of the frame. A pair of transverse members 42, best seen in FIG. 5, are connected to the main frame members 26, 28 adjacent the inner struts and extend outwardly horizontally over wheels 16 at right angles to members 26, 28. Outer wheel struts 44 extend downwardly from members 42 parallel to the inner struts to connect to the outer ends of axle 40. Wheels 16 are mounted to rotate freely on conventional bearings about the axle, which remains stationary.

The frame also includes diagonal bracing between the struts and the main frame members. Inner front diagonal members 46 extend downwardly and rearwardly from the front of each of the main front members at an incline to connect to the inner wheel struts 38 adjacent axle 40. Outer front diagonal members 48, 50 are similarly connected to the outer wheel struts 44, but extend at an angle outwardly from inner members 46 to pass along the outer sides of wheels 16. Also, member 48 is connected at its front end to adjacent member 46 so as to avoid interference with portions of the drive means. Inner and outer rear diagonal frame members 52, 54 extending forwardly and downwardly from the rear ends of each of the main frame members to connect to the inner and outer wheel struts in substantially the same manner as members 46, 50.

Side frame members 56 extend along each side of the conveyor generally parallel to the main frame members but spaced outwardly therefrom to extend along the outer sides of wheels 16. Such members are connected at their ends to the ends of their respective main frame member and are bowed outwardly to connect near their respective centers to connect to the lateral ends of transverse members 42.

A pair of side rails 58 are positioned above the side frame members. The side rails are connected to the main frame members at the rear of the cart. Their rear portions are angled outwardly from the main frame members to follow approximately the same path, when seen in top plan view (FIG. 5), as the rear portion of the side frame members and the outer rear diagonal members. The rails then extend forwardly above the outer sides of wheels 16 and parallel to the main frame members to terminate in a pair of handles 59, best seen in FIGS. 1 and 3.

Together, the side rails 58, side frame members 58 and the outer front and rear diagonal members 50, 54 form a shield or cage extending along each side of the cart. This shield enables the cart to be maneuvered between closely spaced piles of carpet without damaging or soiling the carpet by contact with the wheels or with sharp corners in the drive mechanism or winch drums.

The conveyor 14 includes an endless belt 60 extending laterally between the main frame members and extending lengthwise between front drive roller 30 and rear idler roller 62. The conveyor also includes intermediate idler rollers 64, 66 for supporting the central portions of the conveyor belt.

A tightener roller 68 is positioned along the underside of the conveyor just rearwardly of drive roller 30 for adjusting the tension on the conveyor belt. The drive belt is adjustably supported at its opposite ends by vertically slidable brackets 70, best seen in FIG. 3.

Rectangular sheet metal plates 72, 74, 76 extend from side to side between the main frame members and from front to rear between each of the rollers. Such plates are spaced slightly below the lower surface of the conveyor belt. They help support the conveyor belt and rigidify the frame.

The conveyor belt is preferably made of commercially-available, cord-reinforced, rubber belt material. It has a rough textured or corrugated outer surface for frictionally engaging the surface of a carpet roll and a silicon coated inner surface for sliding easily over the plates and rollers of the conveyor.

At the rear end of the conveyor, that is, the end opposite the drive roller, the conveyor is provided with a sheet metal ramp or transition plate 78. The ramp is positioned rearwardly of and parallel to rear idler roller 62 and spaced slightly below the plane of the upper surface of belt 60. A pair of casters 80 are connected to the undersides of the outer rear diagonal members 52 just forwardly of idler roller 62. The casters support the rearmost edge of ramp 78 just above the ground when the cart is in a tilted position. The cart can thus be moved around in a tilted position without the ramp impeding movement by contact with the ground.

The two winch drums 25 are mounted on opposite ends of a rotating shaft 82. Shaft 82 extends horizontally between the inner front diagonal members 46 and through bearings 84 mounted within such members.

Winch cable 24 is preferably braided nylon cord having a tensile strength of approximately 1400 pounds. The ends of each of the cords are provided with releasable snap connectors 86 for connecting the cables to carpet yoke 22.

Yoke 22, shown in FIG. 4, comprises a generally rectangular plate 88 having a cylindrical drum 90 approximately centered on one side thereof with the axis of the drum normal to the plate. The diameter of the drum is slightly less than the typical diameter of the cylindrical space extending through a carpet roll. A flexible strap 92 is riveted to the opposite side of plate 88 from drum 90. Its ends extend equidistantly in opposite directions from the plate and terminate in D-rings 94 for connection to snap connectors 86.

Referring to FIGS. 3 and 6, the drive means 20 includes an electric motor 100, a gear reduction box 102 having a rotating output shaft 104. Shaft 104 is connected by means of a series of sprocket chains to first driving means 106 for driving the conveyor, second driving means 108 for driving the winch and third driving means 110 for driving the wheels.

The motor is a reversible, variable-speed electric motor. In the preferred embodiment illustrated herein an alternating current motor is used, but a direct current motor can also be used. Referring to FIG. 1, power is provided to motor 100 through a power cord 112 routed through a hand-held control box 114 dangling from a short length of cord 116 adjacent to one of handles 59. The control box is wired in to start, stop, reverse and vary the speed of operation of motor 100.

Referring to FIG. 6, a first sprocket chain 118 extends forwardly beneath the conveyor from output shaft 104 to rotate a sleeve 120 positioned to rotate freely around winch shaft 82. A second sprocket chain 122 extends forwardly from sleeve 120 to a second such sleeve 124 positioned to rotate around a shaft 126. A third sprocket chain 128 extends from an end of shaft 126 to the drive shaft of front drive roller 30. Shaft 126 extends horizontally between bearings 130 connected to the undersides of the inner front diagonal members 46.

The first drive means includes a clutch 132 for selectably engaging the conveyor with the drive means. The clutch includes a sleeve 134 surrounding shaft 126. Sleeve 134 is mounted on a spline or keyway (not shown) so that the sleeve rotates with the shaft but is slidable along its length. The end of sleeve 134 adjacent sleeve 124 is provided with teeth 136 for interengaging with notches 138 in sleeve 124. A throw-out mechanism including a spiral spring 140, a disc 142, and a sleeve member 144 are mounted to rotate freely about shaft 126. A handle 148 is connected to sleeve member 144 and extends outwardly to the side of the cart. A pair of arms 146 connected to sleeve member 144 extend at an angle toward the periphery of disc 142. The arms have notches 147 along their inner sides to loosely receive an outer portion of disc 142. Pushing handle 148 toward the cart pushes sleeve member 144 in the direction of arrow 150, which, in turn, causes arms 146 to engage the disc against spring 140. The spring pushes sleeve 134 into engagement with sleeve 124 to cause shaft 126 to rotate. Clutch 132 can thus be engaged to drive the conveyor belt.

Winch shaft 82 is similarly provided with a clutch 152, which is substantially identical to clutch 132. Clutch 152 has a handle 154 positioned near handle 148 for operating clutch 152 to selectably engage the winch with the drive motor.

A fourth sprocket chain 156 extends rearwardly from shaft 104 to rotate a shaft 158. Shaft 158 extends horizontally beneath the conveyor just rearwardly of wheels 16. Mounted at the ends of the shaft in position to engage the treads of the pneumatic tires of wheels 16 are a pair of concavely cylindrical rubber friction rollers 160. Shaft 158 is received in bearings (not shown) mounted on pivot bars 162 extending lengthwise of the conveyor beneath each of the main frame members.

Referring to FIG. 3, the pivot bars are pivotally attached to the underside of the main frame members by pivot pins 164. A coil spring 166 attached to the end of each pivot bar and to the adjacent spring member urges the pivot bar upwardly to yieldably hold roller 160 a slight distance above the tread of the tire. A scissors mechanism 168 extends between the end of one of the pivot bars and the adjacent frame member. The scissors mechanism is operable to rotate the pivot bars in the direction of arrow 170 to push the friction rollers against the tires. A linkage member 172 extends rearwardly beneath the conveyor from a handle 174 alongside the front of the conveyor to scissors mechanism 168. Handle 174 is pivotally connected to side frame member 56. Pushing handle 174 forwardly enables rollers 160, which are continuously rotating, to be selectably engaged with wheels 16 to drive the cart forwardly or rearwardly, depending on which way the motor is turning.

The sprockets and chains are arranged so that the winch, conveyor and friction rotate in the same direction. The wheels, thus rotate in the opposite direction. The sprockets, friction roller and wheel are all sized so that the speeds of the winch, conveyor and wheels are synchronized. Any two of the winch, wheels, or conveyor can be operated simultaneously to cooperate in loading or unloading a carpet roll.

OPERATION

Referring to FIG. 1, carpet cart 10 is positioned at one end of a roll of carpet 12 to be loaded from the floor. The end of the cart opposite the winch is tilted down and is positioned near the end of the carpet and the conveyor is aligned lengthwise with the carpet. With winch clutch 152 disengaged, sufficient cable 24 is stripped from the winch drums 25 to extend along the length of the cart and carpet roll to the remote end of the carpet roll. The carpet roll yoke 22 is positioned in the remote end of the carpet roll and the snap connectors 86 on the ends of the winch cables are connected to the D-rings 94 of the yoke. The carpet roll is now ready for loading using the winch and the conveyor.

To load the carpet onto the cart, conveyor clutch 132 and winch clutch 152 are engaged while the motor is stopped. Control box 114 is then manipulated to cause the motor to run in the forward direction. The conveyor belt circulates in the direction indicated by arrow 180 and to wind the winch cables toward the winch drums as indicated by arrows 182.

The carpet roll is much heavier than the cart, which can weigh less than 90 lbs. Consequently, operation of the winch initially draws the cart toward the carpet roll, as indicated by arrow 184. When ramp 78 contacts the lower edge of the adjacent end of the carpet roll, the end of the carpet roll slides upwardly along the ramp's inclined upper surface until it contacts the conveyor belt.

Alternatively, the wheels can be used instead of the winch to start loading the carpet onto the cart.

At this point in the self-loading process, the conveyor begins to assist in loading the carpet. When ramp 78 contacts the end of the carpet roll, the ramp slides underneath, raising the roll end until it contacts the conveyor belt. The wheels 16 are caused to rotate by operating lever 174 so as to engage rollers 160. The wheels move the cart rearwardly toward the carpet roll as indicated by arrow 184. If the winch is used to start the roll onto the cart, it continues to assist in loading until disengaged. If the wheels are used, they cease to assist the conveyor once the carpet roll is lifted from the ground.

When the nearer end of the carpet has moved to a point forwardly of the wheels, the rear end of the cart frame lifts upwardly, bringing the conveyor to a more nearly horizontal position. As the carpet continues to advance along the conveyor, the cart continues to tilt until the carpet is approximately centered over the wheels. The conveyor is then substantially horizontal and the carpet balanced on the cart, as shown in FIG. 2. The motor can be turned off and the friction rollers disengaged, allowing the wheels to turn freely.

The carpet can now be transported on the cart with very little effort. One person can easily propel the cart across a variety of terrains, including soft grass or dirt. If desired, the motor can also be used to drive the wheels so that moving the carpet roller around is even easier. Clutches 132, 152 are disengaged and friction rollers 160 engaged to operate the wheels. The control box can then be manipulated to cause the motor to rotate the wheels either forwardly or rearwardly as desired. Use of the motor can thus enable one person to transport a carpet loaded on the cart up a ramp or hill. Rollers 160 can also be engaged to function as a brake when rolling the cart without the assistance of a motor, for example, when rolling the loaded cart down a ramp.

Once the carpet is in the desired location, it is easily unloaded, again by operation of the drive means of the cart. To unload the carpet onto the ground, the loading process can be reversed. Alternatively, the conveyor can again be operated in the direction of arrow 180 to unload the carpet from the front end of the cart.

Referring to FIG. 7, a carpet can be loaded from the cart onto a loading dock or the bed of a truck 186. The front end of the conveyor of cart 10 is connected by a short length of cable 188 extending from an eye 187 in frame member 50 to a connector 199 affixed to the truck bed. Then the conveyor 14 and winch 18 are operated to move the carpet roll lengthwise along the conveyor in the direction of arrow 192 onto the bed of the truck.

Referring to FIG. 8, the cart 10 can also be used to load a carpet onto the cart from a loading dock, a pile of carpets or a truck bed 186. The cart is positioned with ramp 78 abutting the loading dock or truck bed. The winch cables 24 are extended rearwardly into the truck and along a carpet roll 12 lying on the truck bed to connect to yoke 22 at the remote end of the carpet roll. The winch is then operated to draw the carpet out of the truck onto the conveyor, as indicated by arrow 194.

Cart 10 is also capable of loading itself onto a suitably-equipped carpet-hauling truck or van 196, as shown in FIG. 9. The side tailgate 198 of the truck or van is provided a cart support 200 at a lower position on the tailgate, for example, connected to the vehicle's bumper. Support 200 is adapted for receiving ramp 78 and is provided with a lip 202 for holding the cart against the tailgate of the van in a vertical position, the weight of the cart being supported by support 200. The tailgate of the van is also provided at an upper position thereof with means, such as eyes 204, for connecting the snap connectors 86 of winch cables 24 to the tailgate of the van.

To load cart 10 onto the back of the van, the cart is positioned substantially as shown in FIG. 8, but with the ramp 78 resting atop support 200. The winch cables are extended upwardly and rearwardly to connect their connectors 86 to eyes 204. Once the cables are connected, the winch is operated to draw the forward end of the cart upwardly and toward the tailgtate as indicated by arrow 206, until the cart is in a vertical position as shown in FIG. 10. To unload the cart, the winch is operated in reverse to lower the front end of the cart until its wheels contact the ground.

Having shown and described a preferred embodiment of my invention, it should be apparent to those skilled in the art that modifications can be made without departing from the spirit of the invention.

Accordingly, I claim all modifications falling within the scope of the following claims:

1. A self-loading and unloading carpet cart comprising:
   a tiltable, wheeled frame;
   conveyor means supported on said frame for moving a carpet roll lengthwise along a conveyor path;
   winch means for winching said carpet roll lengthwise onto said conveyor means; and
   drive means for driving said winch means and said conveyor means together for cooperatively loading said carpet roll onto the cart.

2. Apparatus according to claim 1 in which said drive means includes a motor and means for selectably engaging said motor to the drive means of the conveyor means and to at least one of the drive means of said winch means and said wheel means.

3. Apparatus according to claim 2 in which said selectable engaging means includes means for operating each of said drive means independently of the other drive means.

4. Apparatus according to claim 2 in which said motor is reversible.

5. Apparatus according to claim 2 in which said motor is a variable speed motor.

6. Apparatus according to claim 1 in combination with a tailgate of a truck, comprising:
   a stationary ramp positioned on an end of the cart rearwardly adjacent one of said rollers for sliding beneath an adjacent end of the carpet roll to start the roll onto the conveyor path on the endless belt;
   lip means on said tailgate for pivotably receiving an end of said stationary ramp at a lower position on said tailgate to removably support the cart thereon; and
   connecting means on said tailgate for connecting an end of a cable of said winch means at an upper position on said tailgate so that the winch means can be operated to rotate said cart between a position on the ground and a carrying position on said tailgate with the end of the ramp pivoting in said lip means.

7. Apparatus according to claim 1 including:
   wheel means supporting said frame, the drive means including wheel drive means for driving the wheel means together with the conveyor means for cooperatively loading said carpet roll onto the cart.

8. Apparatus according to claim 1 in which said conveyor means includes an endless belt operable to circulate around rollers at opposite ends of the cart frame and a stationary ramp positioned on an end of the cart rearwardly adjacent one of said rollers for sliding beneath an adjacent end of the carpet roll to start the roll onto the conveyor path along the endless belt.

9. A self-loading and unloading carpet cart comprising:
   a tiltable, wheeled frame;
   conveyor means supported on said frame for moving a carpet roll lengthwise along a conveyor path;
   means for moving said carpet roll lengthwise onto and off of said conveyor means;
   drive means for driving said moving means and said conveyor means;
   the moving means including winch means comprising a dual winch and a carpet yoke engageable with a remote end of a carpet roll positioned lengthwise of said conveyor path;
   said yoke including a block adapted for insertion into an opening in the remote end of said roll and two flexible straps connected to the block and extending in opposite directions therefrom to connect to said cables.

10. A self-loading carpet cart comprising:
    a tiltable cart having two wheels;
    an endless belt conveyor centered between said wheels operable to circulate parallel to said wheels around multiple support rollers;
    a dual winch near one end of said conveyor having a winch drum on each side of the conveyor;
    a cable operatively connected to each of said drums so that the cables can be pulled alongside the conveyor toward said winch;
    a yoke having a block adapted for insertion into a remote end of a roll of carpet aligned lengthwise with said conveyor and two flexible straps extending in opposite directions from said block;
    connector means for connecting the straps to the cables;
    drive means for driving said wheels, said conveyor and said winch;
    a variable-speed reversible drive motor; and
    means for selectably engaging said motor with said drive means to selectably drive at least one of said conveyor, said winch and said wheels.

11. Apparatus according to claim 10 in which said drive means includes multiple clutch means drivingly connected to said motor, one clutch means operatively connected to each of said conveyor, said wheels and said winch so that said conveyor, said winch and said wheels can be selectably driven independently of one another.

12. Apparatus according to claim 10 in which said drive means are proportioned so that, when any two of said conveyor, wheels and winch are operated simultaneously, their speeds of operation are approximately synchronized.

* * * * *

UNITED STATES PATENT AND TRADEMARK OFFICE
CERTIFICATE OF CORRECTION

PATENT NO. : 4,321,004
DATED : March 23, 1982
INVENTOR(S) : THOMAS V. MILLS

It is certified that error appears in the above-identified patent and that said Letters Patent are hereby corrected as shown below:

Column 1, line 13, "avod" should be --avoid--;

Column 2, line 34, "Francher" should be --Fancher--;

Column 4, line 40, "front members" should be --frame members--;

Column 9, line 15, "claim 1" should be --claim 7--.

Signed and Sealed this

Sixth Day of July 1982

[SEAL]

Attest:

Attesting Officer

GERALD J. MOSSINGHOFF

Commissioner of Patents and Trademarks